United States Patent [19]

Haskell et al.

[11] 4,171,794

[45] Oct. 23, 1979

[54] FIXTURING FOR INSPECTION OF THE INTERIOR OF TIRE CASINGS

[75] Inventors: Richard E. Haskell, Rochester; Forrest Wright, Utica, both of Mich.

[73] Assignee: Industrial Holographics, Inc., Auburn Heights, Mich.

[21] Appl. No.: 881,778

[22] Filed: Feb. 27, 1978

[51] Int. Cl.² .......................................... B60C 25/14
[52] U.S. Cl. .................................................. 254/50.1
[58] Field of Search ........................... 254/50.1–50.4; 81/15.3

[56] References Cited

U.S. PATENT DOCUMENTS

| | | | |
|---|---|---|---|
| 1,762,227 | 6/1930 | Hebbeler | 81/15.3 |
| 3,005,619 | 10/1961 | Bowen | 254/50.3 |
| 3,568,978 | 3/1971 | Larson | 254/50.1 |

Primary Examiner—Robert C. Watson
Attorney, Agent, or Firm—Krass & Young

[57] ABSTRACT

Holder and spreader fixturing for spreading and positioning the bead portions of tire casings to enable unobstructed holographic inspection of the interior of tire casings for manufacturing defects, including holder fixtures comprised of a pair of spreader rings insertable into the rim opening of the tire casing and engaging opposite bead portions of the tire casings. A plurality of U-shaped externally positioned props assembled to each of the spreader rings position the bead portions in the spread-apart position and provide an unobstructed view from the rim opening. Various configurations of the spreader rings include a split one-piece ring; a one-piece ring having trimmed side flanges; and a collapsible hinged spreader ring configuration. The spreader fixturing includes a pair of transverse arms adapted to engage separator rings on opposite tire bead portions, one of the arms being secured to a power cylinder housing and the other movable with the operating rod to produce separation of the tire bead portions upon pressurization of the cylinder.

6 Claims, 9 Drawing Figures

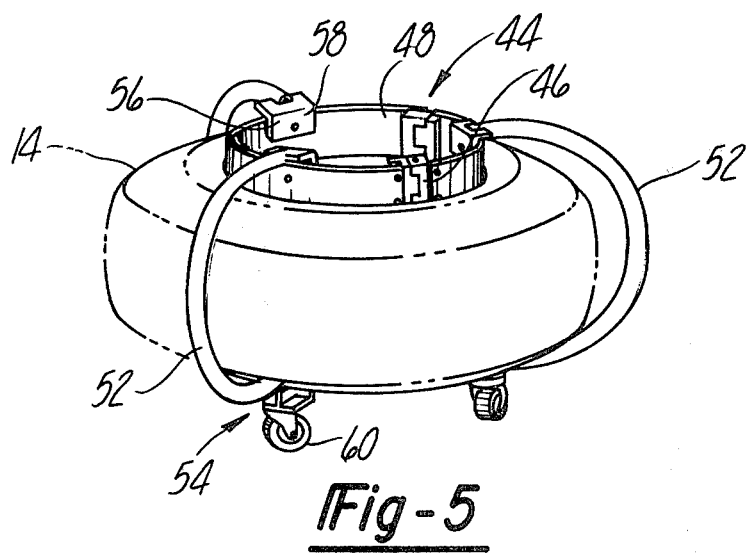
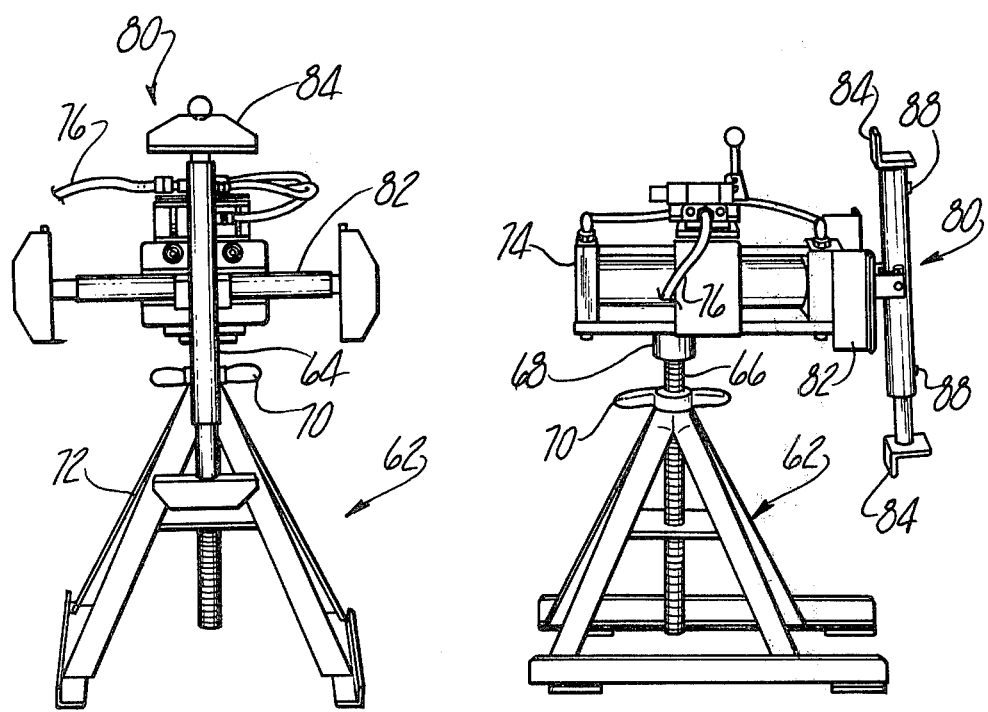

FIXTURING FOR INSPECTION OF THE INTERIOR OF TIRE CASINGS

BACKGROUND DISCUSSION

This invention concerns fixturing for the inspection of tire casings and more particularly fixturing for enabling the interior of tire casings to be inspected for manufacturing defects.

In the course of manufacturing tire casings, it is necessary to carry out inspections to insure that various defects, which may occur in the course of the manufacturing process, are not present in a given selected tire casing, for adequate quality control of the manufacturing process.

One such inspection procedure has involved a holographic analysis of the interior of the tire casing. This necessitates the illumination of the interior of the tire casing to enable the formation of a hologram on the interior surface of the tire casing, which allows detection of certain manufacturing defects in the casing. In the practice of this method, it is necessary that the tire casing bead portions be spread apart in order to properly dispose the casing interior for the illumination of the interior by the inspection apparatus and the spread-apart condition of the tire bead portion must of course be maintained as the inspection process is carried out. The prior art approach has been to successively displace portions of the tire casing bead portion and successively position props extending across the interior of the tire casing.

The spreading for large truck tires requires the use of a power-operated spreader in order to carry out this method.

There are several disadvantages to this approach in the context of optical type inspection methods, including the holographic process described. Firstly, the props extending across the interior of the tire casing in engagement with the tire bead obstructs the viewing of the tire casing interior since the inspection apparatus is positioned within the rim opening of the tire casing and scans successive sections of the interior of the tire casing with illuminating beams in order to form the hologram of the tire casing interior surface. The presence of the props thus shadows a portion of the tire interior casing enabling defects to go undetected in these regions.

Secondly, the localized stress patterns created by the engagement of each of the props with the tire casing beads have been found to affect the hologram so formed which makes more difficult the detection of certain types of manufacturing defects in the tire.

Finally, the procedure of successively placing the props is relatively time consuming since it involves the progressive spreading of the tire and placement of each prop about the circumference of the tire bead.

It is accordingly an object of the present invention to provide a tire spreading holding fixture in which the tire bead portions may be maintained in a spread-apart position without obstructing the interior of the tire casing when viewed from a point interior of the tire casing rim opening.

It is yet another object of the present invention to provide such a holding fixture in which the engagement pressure in holding the tire rim bead does not create a localized stress on the tire casing bead such as to enable effective holographic analysis.

It is yet another object of the present invention to provide a tire casing spreader which simplifies the spreading of the large size tire casings which require power-operated equipment to carry out.

SUMMARY OF THE INVENTION

These and other objects of the present invention, which will become apparent upon a reading of the following specification and claims, are accomplished by a holder fixture comprised of a pair of spreader rings configured to be inserted with respect to the opposite tire casing bead portion. A plurality of props are adapted to be assembled into the fixture in engagement at each end with a respective separator ring which props extend about the exterior of the tire casing when in engagement with the separator rings. The spreader rings are variously configured to enable the ready insertion into the tire rim opening while providing a large diameter bead engaging rim. The various configurations include a split spreader ring; a hinged section circumferential spreader ring to enable collapsing of the ring; and also a one-piece ring having oppositely located sections of a rim cut off to provide the necessary clearance for insertion into the tire casing rim opening. The tire casing spreader fixturing comprises a pair of crossing spreader arms which are adjustable in length and have an end configuration adapted to engage spreader rings placed in engagement with the tire casing bead portions, with one of the arms mounted to an actuating shaft of a power cylinder and the other fixed to the power cylinder housing such that upon actuation thereof, the tire casing bead portions may be separated by the relative axial movement of the spreader arms.

DESCRIPTION OF THE DRAWINGS

FIG. 5 is a perspective view of another embodiment of the holder fixture according to the present invention.

FIG. 6 is a front elevational view of the spreader fixture according to the present invention.

FIG. 7 is a side elevational view of the spreader fixture shown in FIG. 6.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
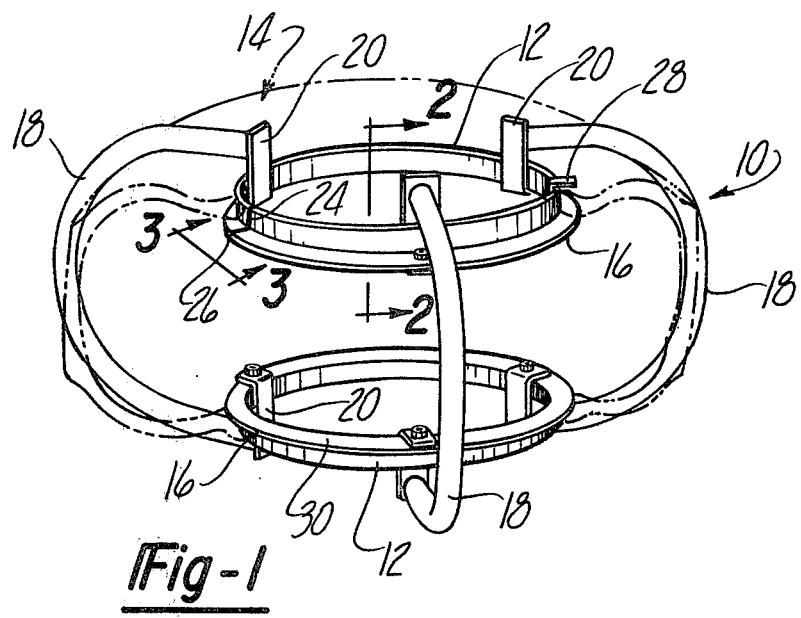
FIG. 1 is a perspective view of a holding fixture according to the present invention.

Referring to the drawings, the holding fixture 10 is depicted in FIG. 1 and includes a pair of spreader rings 12 supported in an axially spread-apart position with respect to each other and in engagement with a tire casing 14 bead portion (shown in phantom). Each of the spreader rings 12 is hat-shaped, having a radially extending rim 16 which engages the tire casing 14 bead portions and is of a suitable diameter for a given tire size.

Each of the spreader rings 12 is maintained in a spread-apart, axially spaced position as shown corresponding to the degree of spreading of the tire casing 14 bead portions suitable for carrying out the inspection process by means of a plurality of spreader props 18. Each of the spreader props 18 may be assembled into the fixture by being detachably securable at either end to a respective spreader ring 12, such as to prop the spreader rings 12, i.e., to hold the same in the axially spaced relationship in engagement with the tire bead portions.

Each of the spreader props 18 rather than extending across the opening between the opposite tire bead portions, extend outwardly about the exterior of the tire casing 14 as shown, and hence are of a generally U-shaped configuration.

Figure 2:
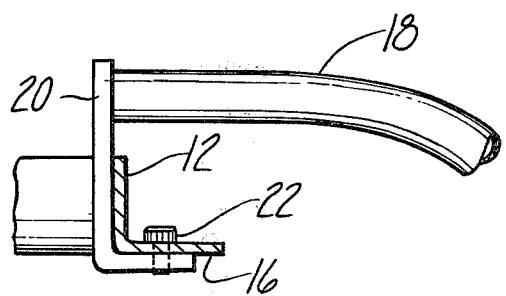
FIG. 2 is an enlarged detailed view of a portion of one of the spreader rings along the direction of the lines 2—2 in FIG. 1.

In the configuration shown in FIG. 1, each end of the spreader props 18 is adapted to hook over the respective spreader rings 12 such as to securely engage these rims as shown in FIG. 2. This engagement is secured by a pin and hole connection between the spreader ring rim 16 and an angle bracket 20 secured to the pin of each of the spreader props 18. The pin connection comprises a pin secured to one or the other of the rim 16 and angle bracket 20 passing through a hole formed in the opposite member.

Figure 3:
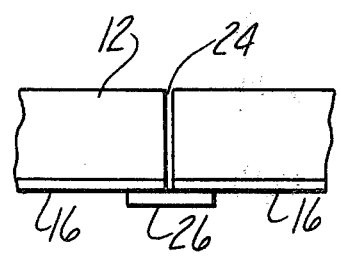
FIG. 3 is a fragmentary view of a portion of a holder fixture shown in FIG. 1 depicting the details of engagement between the spreader props and the spreader rings.

In order to insert the spreader rings 12 into the tire casing 14, the larger outside diameter of the spreader rings 12 necessitates an arrangement for allowing the spreader rings 12 to be installed through the smaller diameter rim opening of the tire casing. In the embodiment shown in FIG. 1, this is accommodated by a split 24 formed in each of the spreader rings as shown in FIG. 3, the split 24 extending entirely through each of the spreader rings 12. A stop plate 26 is welded to one end of the split ends of the spreader rings 12, which extend across the split 24 and lap the rim portion 16 of the one split end. Thus, upon an axially directed pressure exerted by the bead portion of the tire casing upon being spread apart, the stop plate 26 serves to locate the split ends of the rim 16 in alignment with each other.

Each of the spreader rings 12 may thus be installed by separating the split ends and threading the spreader rings 12 into the tire casing rim opening, aligning the same with the rim 16 concentric to the casing bead and assembling the spreader props 18 thereto forcing the spreader rings 12 axially away from each end and securing the tire casing in the spread-apart position.

In order to facilitate this procedure, a catch tab 28 is provided to secure to the upper portion 30 of each of the spreader rings 12 which serves to hook each of the rims to a respective bead portion to maintain the position of each of the rims to facilitate the maintaining of each of the spreader rings 12 in position while the spreader props 18 are installed.

Figure 4:
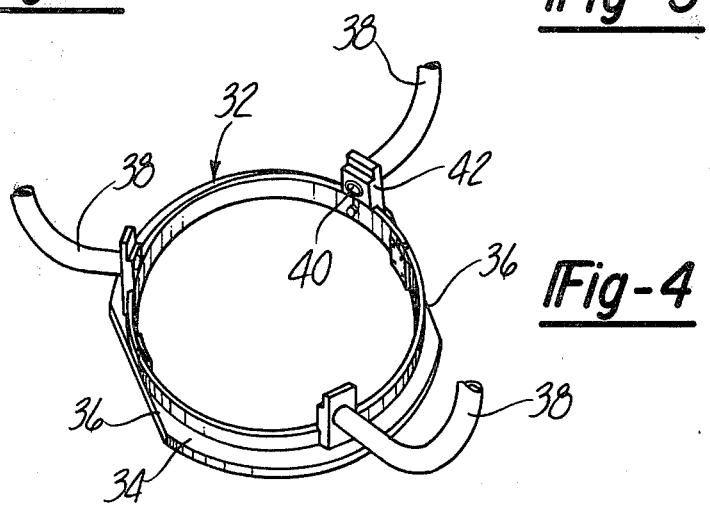
FIG. 4 is a perspective view of a portion of the holder fixture according to the present invention of a different configuration.

FIG. 4 depicts an alternate version of the spreader ring configuration which likewise enables the installation of spreader rings into the rim opening on the tire casing 14. This configuration comprises a spreader ring 32 which similarly is hat-shaped in shape, bearing a rim 34 which is adapted to engage the inside of the tire casing bead portions. In this case, the spreader ring 32 is of solid construction with the rim section 34 cut off along opposite parallel edges 36 with the space between the edges being just approximately equal to the diameter of the tire casing rim opening. Thus, by orienting the spreader rings 32 with the cut-off edges 36 positioned into the tire casing rim opening, the spreader ring 32 may pass into the interior of the tire casing while the rim 34 still provides adequate support upon installation of the props 38. In this configuration, the props 38 are secured to the rim by end pins 40 which are inserted into brackets 42 mounted to each of the spreader rings 32, each of the brackets 42 having a corresponding opening to seat and retain the pins 40 such as to secure the pair of spreader rings 32 axially spaced in the spread-apart position with respect to each other. The props 38 are similarly U-shaped in configuration contemplated to thus pass about the exterior of the tire casing 14 and leave the interior tire casing unobstructed when inspected from a point within the tire casing rim opening.

FIG. 5 depicts yet another embodiment in which a hinged spreader ring 44 is provided. In this embodiment, the spreader ring 44 is rendered collapsible by being formed by a plurality of at least three sections by pivotable connections 46 joining respective sections 48. Each of the series 48 is configured with a rim 50 in similar fashion to the other embodiments which are adapted to engage and exert an axial pressure on the tire casing 14 bead section. The pivotable connection 46 allows the rims of each of these spreader rings 44 to be folded together upon removal of one of the hinge pins 47 to allow the ring 44 to be inserted into the tire casing 14 rim opening. After the installation of the U-shaped props 52, the tire casing 14 bead portions are held spread-apart, as in the other versions. In this embodiment, the spreader props 52 and brackets 54 are secured to each end thereof with an axial extending portion 56 having locking pins 58 which pass into openings in each of the spreader ring sections 48, to secure each of the U-shaped props in position. The lower brackets 54 are shown with caster-rollers 56 which allow the assembly to move about conveniently.

It can be seen that each of these embodiments consists of the spreader rings having a rim portion adapted to engage the bead portion of a tire casing, with the U-shaped props extending exteriorly around the outside of the tire casing leaving the opening between the bead portions completely unobstructed, such that a holography apparatus positioned within the rim opening of the tire casing may inspect the entire interior surface areas of the tire casing. The rims distribute the pressure equally around the tire casing to insure that the localized stressing on the bead of the tire casing does not occur and thus will not interfere with holographic interferometry to allow detection of defects in the tire.

At the same time, the arrangement is relatively simple and easily installed.

The holder fixture arrangements described are generally adapted to be installed manually and are being contemplated as being applicable to tire sizes as are utilized in passenger cars and light trucks, since the forces required to spread the bead portions of the tire casing are relatively modest. Larger tires, such as for heavy trucks, require power equipment for spreading the tire casing. Such a spreader fixture apparatus is depicted in FIGS. 6 through 9, pictured with a stand 62 which supports a cylinder assembly 64 at an adjustable height by means of an externally threaded shaft 66, secured to a collar 68 at one end and passing through a thread locking ring 70 and also threadably engaging a bore formed in a plate 72.

The power cylinder assembly 64 includes a power hydraulic cylinder 74 supplied with hydraulic fluid from a suitable hydraulic power source via lines 76 with a control valve 78 provided to control the pressurization of hydraulic cylinder 74. Located at the front end of the hydraulic cylinder 74 is the spreader fixture comprised of a pair of adjustable length arms 80 and 82, each extending transversely, i.e., normally to each other.

Arm 80 includes end brackets 84 secured to rods, each slidably received within a tube 86. A setscrew 88 serves to secure the end brackets 84 in any adjusted position.

Figure 8:
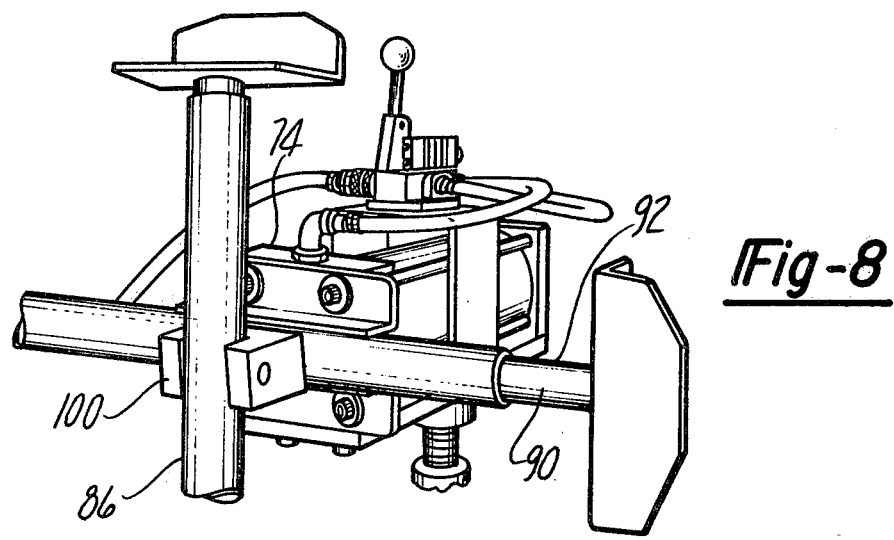
FIG. 8 is a fragmentary view of the spreader fixture shown in FIG. 7 depicted in engagement with a tire casing.

Similarly, the horizontally extending arm 92 (FIG. 8) is provided with end brackets 90 secured to rods 92 slidably received within a pair of tubes 94 and a setscrew 96 provided in either tube 94 to secure the end brackets 90 in any given adjusted position. The rod 92 is provided with a groove 98 into which the setscrew 96 extends to secure the end brackets 90 against rotation with respect to the tubes 94 to maintain proper attitude. A similar groove (not shown) is provided for the end brackets 84. The vertically extending arms 80 are secured to a clevis 100 which is secured to the operating rod 104 of the hydraulic cylinder 74. The horizontally extending arm 82 on the other end is fixed with respect to the hydraulic cylinder as shown in FIG. 8.

Thus, the horizontally extending arm 82 is fixed relative to the hydraulic cylinder 74.

Figure 9:
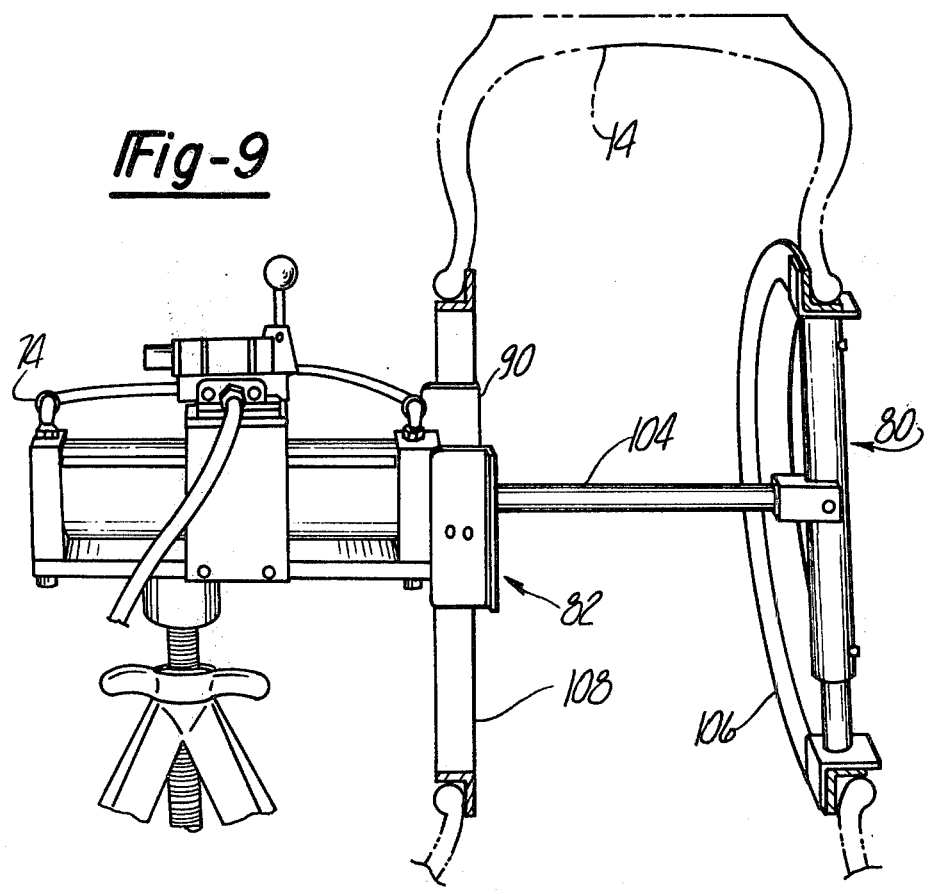
FIG. 9 is a fragmentary view depicting the installation of spreader props after the spreading thereof by the fixture shown in FIGS. 6 through 8.

Upon actuation of the cylinder, the operating rod 104 separates the brackets 80 and 82 as shown in FIG. 9.

In use, the tire casing 14 is mounted on the arms 80 and 82 with the pair of spreader rings 106 and 108 provided with the end bracket 84 and 90, respectively, engaging a respective ring 106 and 108. The spreader rings 106 and 108 are preferably configured according to the preferred embodiment of the present invention, i.e., the configuration shown in FIGS. 1 through 3. Upon pressurization of the hydraulic cylinder 74, extension of the operating rod 104 and end brackets 84 and 90 causes spreading of the tire bead portion and the spreader props may then be installed. If the collapsing pressure is great, a reduced number of straight conventional props may be utilized, engaging the spreader rings 106 and 108. While the use of such props does create an obstruction of the interior space, the number of such props is reduced because of the presence of the spreading rings 106 and 108, i.e., to a minimal number of four such props. Thus, this still partially achieves the advantages of the present invention.

The embodiments of the invention in which an exclusive property or privilege is claimed are defined as follows:

1. A holder fixture for positioning the bead portions of a tire casing in a spread-apart position, said holder fixture comprising:
   a pair of spreader rings, each having a rim portion adapted to engage the interior of the respective bead portions of said tire casing;
   a plurality of props detachably securable at either end to a respective one of said pair of spreader rings, each of said plurality of props being of generally U-shape to extend about the exterior of a tire casing in engagement with said spreader rings, said plurality of props further positioning said spreader rings in axially displaced position corresponding to the spread-apart position of said tire casing bead portions;
   whereby said tire casing may be maintained with said bead portions in a spread-apart condition allowing inspection of said tire casing interior without obstruction from said spreader or said props, and;
   whereby said spreading pressure is uniformly distributed about said bead portions by said engagement of said spreader ring rim portions with the respective tire casing bead portions.

2. The holder fixture according to claim 1 wherein each of said pair of spreader rings is formed with a split portion allowing the insertion of said spreader rings into the rim opening of said tire casing.

3. The holder fixture according to claim 2 wherein each of said spreader rings is formed with a stop plate extending across said split portion preventing relative movement between said split end portions of said spreader ring by engagement with said tire casing bead portions.

4. The holder fixture according to claim 1 wherein each of said spreader rings is formed with a tab section adapted to engage the outer portion of said tire bead portion whereby each of said pair of spreader rings may be positioned within the rim opening of said tire casing prior to installation of said plurality of props.

5. The holder fixture according to claim 1 wherein each of said spreader rings is comprised of a plurality of sections interconnected by hinge means, at least one of which is releasable, whereby said spreader rings may be collapsed by release of said at least one hinge means and hinging of said sections for insertion into said tire casing.

6. The holder fixture according to claim 1 wherein each of said pair of spreader ring rim portions is cut off along opposite sides of said spreader rings and wherein said dimension of said spreader rings across said cut-off portions of said spreader ring rims is of the same diameter as said opening of said tire casing rim opening, whereby said spreader rings may be inserted into said tire casing rim opening while the remainder of said rim section is engageable with said tire casing bead portion to exert said spreading pressure thereon.

* * * * *